United States Patent
Park et al.

(10) Patent No.: US 10,205,366 B2
(45) Date of Patent: Feb. 12, 2019

(54) ELECTRIC COMPRESSOR

(71) Applicant: Hanon Systems, Daejeon (KR)

(72) Inventors: Il Young Park, Daejeon (KR); Chan Ho Baek, Daejeon (KR); Young Hun Lee, Daejeon (KR)

(73) Assignee: HANON SYSTEMS, Daejeon (KR)

(*) Notice: Subject to any disclaimer, the term of this patent is extended or adjusted under 35 U.S.C. 154(b) by 1 day.

(21) Appl. No.: 15/108,583

(22) PCT Filed: Oct. 7, 2015

(86) PCT No.: PCT/KR2015/010609
§ 371 (c)(1),
(2) Date: Jun. 28, 2016

(87) PCT Pub. No.: WO2016/060403
PCT Pub. Date: Apr. 21, 2016

(65) Prior Publication Data
US 2017/0214293 A1 Jul. 27, 2017

(30) Foreign Application Priority Data
Oct. 13, 2014 (KR) .......... 10-2014-0137751

(51) Int. Cl.
H02K 9/10 (2006.01)
H02K 11/33 (2016.01)
H02K 5/20 (2006.01)
F04B 39/06 (2006.01)
F04C 29/04 (2006.01)
H02K 7/14 (2006.01)

(52) U.S. Cl.
CPC ............... *H02K 9/10* (2013.01); *F04B 39/06* (2013.01); *F04C 29/047* (2013.01); *H02K 5/20* (2013.01); *H02K 11/33* (2016.01); *F04C 2240/30* (2013.01); *F04C 2240/808* (2013.01); *H02K 7/14* (2013.01)

(58) Field of Classification Search
CPC . H02K 11/33; H02K 5/20; H02K 7/14; H02K 9/10; F04B 39/06; F04C 2240/30; F04C 2240/808; F04C 29/047
USPC .......................................................... 310/55
See application file for complete search history.

(56) References Cited

U.S. PATENT DOCUMENTS 4,066,921 A * 1/1978 Blank ...................... H02K 3/51
310/61
7,207,187 B2 4/2007 Funahashi et al.
(Continued)

FOREIGN PATENT DOCUMENTS

JP 2011163148 A 8/2011
KR 20120095735 A 8/2012
KR 101260104 B1 5/2013

*Primary Examiner* — Alex W Mok
(74) *Attorney, Agent, or Firm* — Shumaker, Loop & Kendrick, LLP; James D. Miller

(57) ABSTRACT

Disclosed herein is an electric compressor. The electric compressor includes an inverter cover which is mounted to an outer surface of a compressor housing in which compression of refrigerant is implemented, and a printed circuit board which is disposed inside the inverter cover and mounted with a plurality of heat generating elements that come into surface contact with one surface of the compressor housing and perform heat transfer with low-temperature refrigerant supplied into the compressor housing.

12 Claims, 4 Drawing Sheets

(56) References Cited

U.S. PATENT DOCUMENTS

| | | |
|---|---|---|
| 2003/0200761 A1 | 10/2003 | Funahashi et al. |
| 2010/0148593 A1* | 6/2010 | Ohashi .................. H02K 55/02 |
| | | 310/10 |
| 2011/0193452 A1 | 8/2011 | Yakushiji |
| 2012/0308414 A1 | 12/2012 | Ogawa et al. |
| 2013/0014518 A1* | 1/2013 | Aigouy .................... F25B 9/00 |
| | | 62/6 |

* cited by examiner

ELECTRIC COMPRESSOR

CROSS-REFERENCE TO RELATED PATENT APPLICATIONS

This patent application is a United States national phase patent application based on PCT/KR2015/010609 filed Oct. 7, 2015, which claims the benefit of Korean Patent Application No. 10-2014-0137751 filed Oct. 13, 2014, the disclosures of which are hereby incorporated herein by reference in their entirety.

TECHNICAL FIELD

Exemplary embodiments of the present invention relate to an electric compressor, and more particularly, to preventing an inverter installed in an electric compressor from overheating.

BACKGROUND ART

Generally, a compressor used in an air conditioning system for vehicles sucks refrigerant that has been evaporated by an evaporator, converts it into a high-temperature and high-pressure state, which can be easily liquefied, and then transfers it to a condenser. The compressor is configured to substantially compress refrigerant. Such compressors are classified into a reciprocating compressor which performs reciprocating motion to compress refrigerant, and a rotary compressor which performs rotational motion to compress refrigerant. Rotary compressors are classified into a mechanical type which rotates using an engine as a drive source, and an electric type which uses a motor as a drive source.

Electric compressors use an inverter to control the rotating speed thereof. The inverter employs a plurality of heat generating elements which generate heat during an operation process. Because such heat generating elements typically have low durability, there is a problem in that it is relatively difficult to cool the elements in such a way that refrigerant flows directly through the elements.

To overcome the foregoing problem, a technique was proposed, in which the installation location of an inverter is adjusted to an intake-side plate of a compressor so that heat generated from the inverter can be transferred to the intake-side plate and cooled by heat exchange with refrigerant flowing along the intake-side plate.

Such a conventional inverter installed in an electric compressor is used to control the operation of an air conditioning system for vehicles.

The inverter is configured with a typical motor drive circuit and a control unit. The motor drive circuit may be heated to high temperatures by heat generated from a semiconductor switching element, etc. constituting the circuit. In this case, a current control value for the semiconductor element in the inverter is reduced by high-temperature heat. If current higher than the control value is applied, the semiconductor element may be damaged. Furthermore, since the electric compressor is disposed in an engine room, the inverter may be maintained in a high-temperature state by heat generated from an engine.

To minimize heat of the heat generating element installed in the inverter, a conventional technique in which thermal grease is applied to a lower surface of a separate support body enclosing a lower portion of the heat generating element so as to reduce heat of the heat generating element which is operated at high temperatures, was proposed.

However, there is a problem in that because the thickness of the support body is added to the thickness of the intake-side plate of the compressor, heat exchange between low-temperature refrigerant and the heat generating device cannot be reliably performed.

The above-mentioned problem causes malfunction due to overheating of the heat generating device. Moreover, the addition of the separate support body increases the production cost. Therefore, countermeasures for solving the problems are required.

Technical Problem

An embodiment of the present invention relates to a structure capable of reliably cooling a heat generating element installed in an inverter, thus promoting the stable operation of a target in which an inverter is mounted.

Technical Solution

An electric compressor in accordance with an embodiment of the present invention may include an inverter cover mounted to an outer surface of a compressor housing in which compression of refrigerant is implemented; and a printed circuit board disposed inside the inverter cover and mounted with a plurality of heat generating elements that come into surface contact with one surface of the compressor housing and perform heat transfer with low-temperature refrigerant supplied into the compressor housing.

When it is assumed that a distance between a lower surface of the printed circuit board and a lower surface of each of the heat generating elements is L1 and a distance between the lower surface of the printed circuit board and the one surface of the compressor housing is L2, the distance L1 may be greater than the distance L2.

The inverter cover may include a heat absorption part formed on an inner surface of the inverter cover so as to absorb high-temperature heat generated from the printed circuit board.

The electric compressor may further include a fastening unit fixed to the compressor housing from an outside of the printed circuit board.

The fastening unit may include: a main body including a first end inserted into the compressor housing, and a second end extending to an upper surface of the corresponding heat generating element, the main body having a first thermal conductivity; and a cover body configured to enclose an outer surface of the main body, the cover body having a second thermal conductivity different from the first thermal conductivity of the main body.

Any one of copper, aluminum or silver may be selectively used for the main body, and any one of iron or an aluminum alloy may be selectively used for the cover body.

The compressor housing may be configured such that the thickness of a plate formed on a surface thereof that faces the printed circuit board is less than the thickness of a plate of an adjacent surface thereof.

The electric compressor may further include a coupling unit selectively fixed between or released from the inverter cover and the compressor housing.

The compressor housing may include an extension, which extends toward a lower surface of the printed circuit board, and into which the fastening unit is inserted.

An electric compressor in accordance with another embodiment of the present invention includes: a compressor housing in which compression of refrigerant is implemented, with a depression formed in an outer surface of the compressor housing; an inverter cover mounted to the outer surface of the compressor housing; and a printed circuit board disposed inside the inverter cover and mounted with a plurality of heat generating elements that perform heat transfer with low-temperature refrigerant supplied into the compressor housing, the heat generating elements being disposed in the depression.

The depression may be formed at a position facing the heat generating elements.

The depression may be formed to a depth to which the heat generating elements are partially inserted.

The compressor housing may be configured such that the thickness of a plate formed on a surface thereof that faces the printed circuit board is less than the thickness of a plate of an adjacent surface thereof.

The electric compressor may further include a fastening unit fixed to the compressor housing from an outside of the printed circuit board. The fastening unit may include: a main body including a first end inserted into the compressor housing, and a second end extending to an upper surface of the corresponding heat generating element, the main body having a first thermal conductivity; and a cover body configured to enclose an outer surface of the main body, the cover body having a second thermal conductivity different from the first thermal conductivity of the main body.

An electric compressor in accordance with yet another embodiment of the present invention includes: a compressor housing in which compression of refrigerant is implemented, with a depression formed in an outer surface of the compressor housing; an inverter cover mounted to the outer surface of the compressor housing; a printed circuit board disposed inside the inverter cover and mounted with a plurality of heat generating elements that perform heat transfer with low-temperature refrigerant supplied into the compressor housing, the heat generating elements being disposed in the depression; a fastening unit fixed to the compressor housing from an outside of the printed circuit board; a sensing unit configured to sense an operating temperature of the heat generating elements; and a control unit configured to selectively control, depending on a temperature state of the heat generating elements sensed by the sensing unit, a circulation rate of the refrigerant that circulates through the compressor housing.

Advantageous Effects

In embodiments of the present invention, even when a heat generating element mounted in an inverter is heated to high temperatures, it can be cooled by heat transfer with low-temperature refrigerant supplied into a compressor housing.

In embodiments of the present invention, overheat, malfunction or damage of the heat generation element is prevented, whereby the electric compressor can be fundamentally prevented from being disabled by breakdown, and thus can be stably used.

MODE FOR INVENTION

Hereinafter, an electric compressor according to an embodiment of the present invention will be described with reference to the attached drawings.

Figure 1:
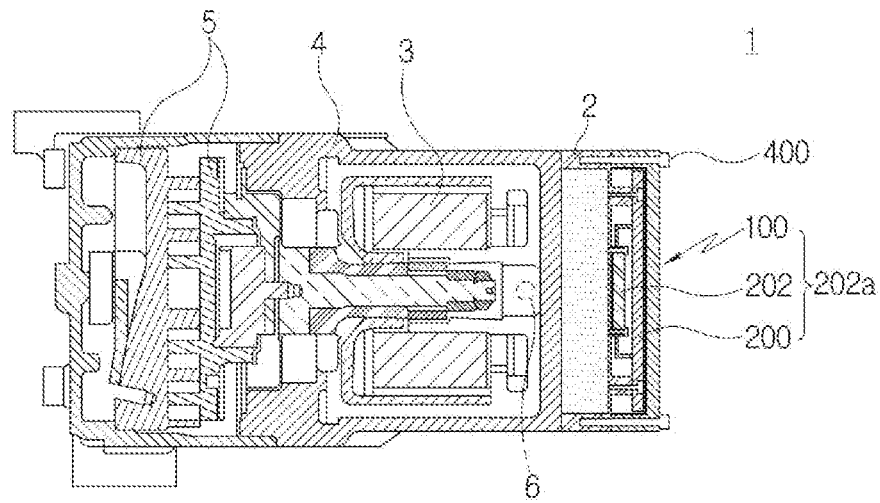
FIG. 1 is a longitudinal sectional view illustrating installation of an electric compressor in accordance with an embodiment of the present invention.
Figure 2:
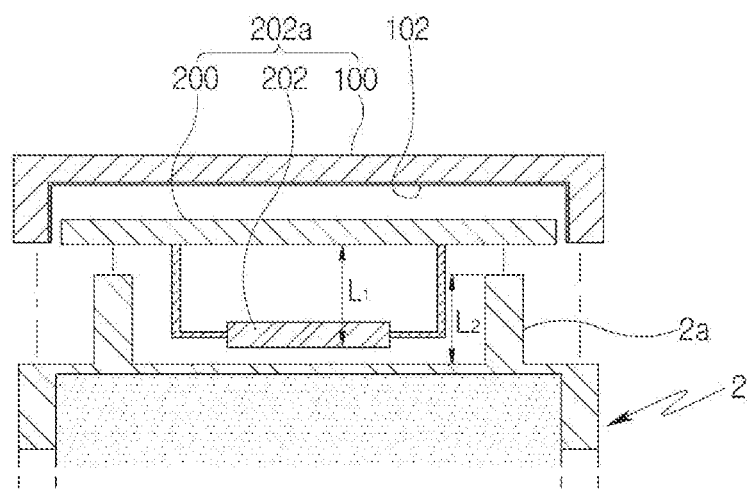
FIG. 2 is a sectional view illustrating a process of mounting an inverter in a compressor housing in accordance with the embodiment of the present invention.
Figure 3:
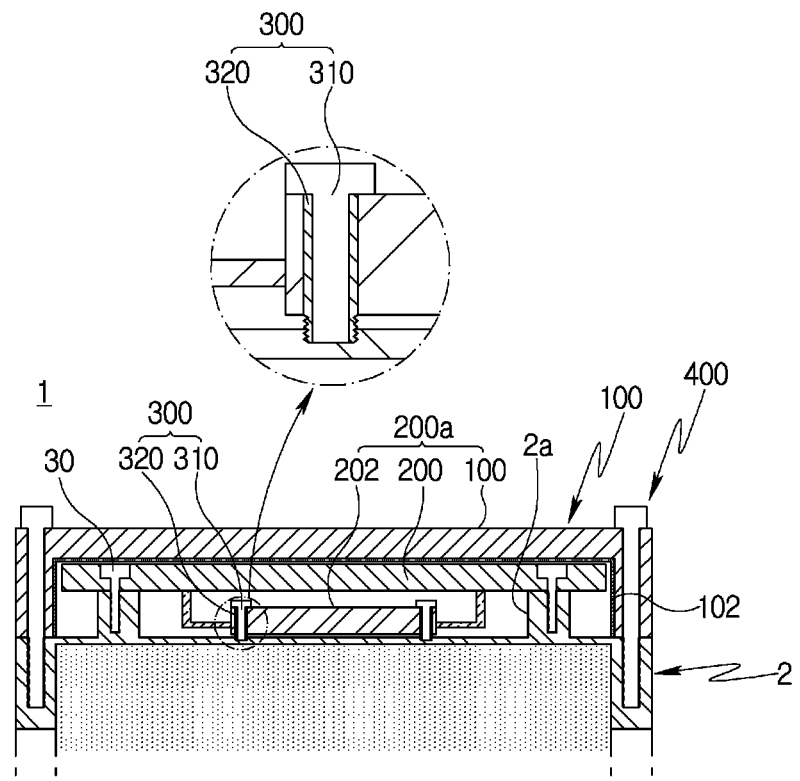
FIG. 3 is a sectional view illustrating the inverter installed in the compressor housing in accordance with the embodiment of the present invention.
Figure 4:
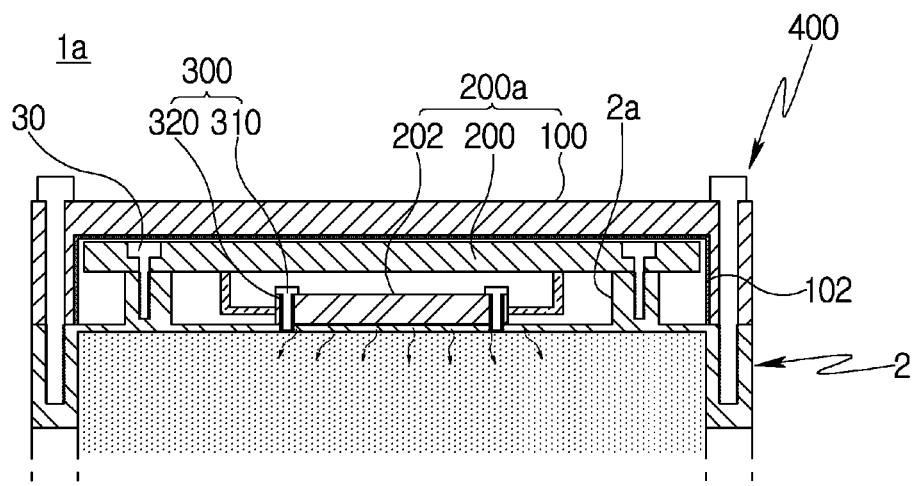
FIG. 4 is a sectional view illustrating a cooling operation for dissipating heat generated from the inverter in accordance with the embodiment of the present invention.

For reference, FIG. 1 is a longitudinal sectional view illustrating installation of an electric compressor in accordance with an embodiment of the present invention, FIG. 2 is a sectional view illustrating a process of mounting an inverter in a compressor housing in accordance with the embodiment of the present invention, FIG. 3 is a sectional view illustrating the inverter installed in the compressor housing in accordance with the embodiment of the present invention, and FIG. 4 is a sectional view illustrating a cooling operation for dissipating heat generated from the inverter in accordance with the embodiment of the present invention.

Referring to FIGS. 1 to 4, an electric compressor 1 includes a main body 4 which houses a motor unit 3 therein, an inverter cover 100 which covers an outer surface of the compressor housing 2, and a printed circuit board 200 which is disposed inside the inverter cover 100 and is mounted with a plurality of heat generating elements 202 that come into surface contact with one surface of the compressor housing 2 and perform heat transfer with low-temperature refrigerant supplied into the compressor housing 2.

The motor unit 3 may be configured with various types of components, and the components of the motor unit 3 may be modified into various forms rather than being limited to specific type components.

The electric compressor 1 includes a compression unit 5 which is formed ahead of the motor unit 3 and in which refrigerant compression is implemented. The motor unit 3 and the compression unit 5 communicate with each other to allow the refrigerant to move therebetween. An intake port 6 is formed at a predetermined position on the main body 4 so that refrigerant is drawn into the main body 4 through the intake port 6. A discharge port (not shown) is formed on the main body 4 so that refrigerant compressed by the motor unit 3 is discharged through the discharge port.

Refrigerant drawn into the main body 4 through the intake port 6 is transferred to the compression unit 5 via the motor unit 3 and compressed to a predetermined pressure before being discharged out of the compressor through the discharge port.

The electric compressor 1 that is operated in the above-mentioned manner includes an inverter 202a which includes the heat generating elements 202 mounted to the printed circuit board 200 and a plurality of electronic components (not shown) so as to supply power to the motor unit 3 and control the operating conditions thereof.

Although the inverter 202a has been illustrated as being disposed behind the compressor housing 2, the position of the inverter 202a is not limited to this position, and it may be modified in various ways.

The inverter 202a includes an inverter cover 100, and the printed circuit board 200 to which the heat generating elements 202 are mounted. The inverter cover 100 is mounted to the outer surface of the compressor housing 2 in which compression of refrigerant is implemented. In more detail, the inverter cover 100 is disposed outside the intake port 6 and fixed to the compressor housing 2 by a coupling unit 400, which will be described later herein.

The printed circuit board 200 is mounted with a plurality of electrical parts on an upper surface thereof. For example, transistors or capacitors are disposed on the upper surface of the printed circuit board 200, and the heat generating element 202 which is heated to high temperatures is mounted to a lower surface of the printed circuit board 200.

The heat generating element 202 is a high-power switching semiconductor and is used to control operating conditions of the electric compressor that is needed to be precisely operated. In addition, due to a high operating speed and low power consumption, the heat generating element 202 is widely used for various targets that need precise control.

A plurality of heat generating devices 202 may be used, and the configuration thereof is not limited to that illustrated in the drawing. The heat generating element 202 is disposed such that the lower surface thereof fully comes into close contact with one surface of the compressor housing 2. As such, in the case where the heat generating element 202 comes into close contact with one surface of the compressor housing 2, the heat generating element 202 can perform heat transfer with low-temperature refrigerant drawn into the electric compressor through the intake port 6. Thereby, even though the heating generating element 202 is operated to be heated to high temperatures, the temperature thereof can be decreased by the heat transfer.

The inverter cover 100 is fixed to the outer surface of the compressor housing 2 by the coupling unit 400 and is formed on an inner surface thereof with a heat absorption part 102 which is provided to absorb high-temperature heat generated from the printed circuit board 200. The heat absorption part 102 absorbs, of heat generated from the printed circuit board 200 or heat generated from the heat generating element 202, residual heat that has not been transferred to the surface of the compressor housing 2, whereby high-temperature heat can be prevented from being focused on the printed circuit board 200 or the heat generating element 202.

Therefore, even if the electric compressor 1 is operated for a long time, the electric compressor 1 is prevented from remaining in a high-temperature state, or the surface temperature thereof is prevented from being partially excessively increased at a certain position, and high-temperature heat generated from the heat generating element 202 is reliably absorbed to the heat absorption part 102, Consequently, the internal temperature of the inverter 202a can be prevented from being rapidly increased.

The heat absorption part 102 is made of material having high thermal conductivity. For example, any one of copper, aluminum or an aluminum alloy may be selectively used, or materials other than the above-listed materials may be selectively used.

The heat absorption part 102 may be formed on the inner surface of the inverter cover 100 by insert molding or fixed thereto by a hook (not shown) or protrusion (not shown).

The electric compressor 1 includes a fastening unit 300 which is fixed to the compressor housing 2 from the outside of the printed circuit board 200. As shown in the drawings, either a screw or a bolt is selectively used as the fastening unit 300. However, the fastening unit 300 is not limited to a specific element.

In an embodiment, the fastening unit 300 includes a main body 310 and a cover body 320. One end of the main body 310 is inserted into the compressor housing 2, and the other end thereof extends to an upper surface of the heat generating element 202. The main body 310 has a first thermal conductivity. The cover body 320 encloses an outer surface of the main body 310 and has a second thermal conductivity different from that of the main body 310.

An external thread for coupling with the compressor housing 2 is longitudinally formed on the outer surface of the main body 310 so that the main body 310 can be fixed the compressor housing 2. For reference, an internal thread is formed in an insert hole that is formed in the compressor housing 2 with which the lower surface of the heat generating element 202 is brought into close contact, whereby the fixed state thereof can be stably retained.

The heat generating element 202 has an open insert hole into which the main body 310 is inserted, but an internal thread is not formed in the open insert hole, and the main body 310 merely comes into surface contact with the inner surface of the open insert hole.

Any one of copper, aluminum or silver is selectively used as the material of the main body 310. The copper, aluminum or silver has a high thermal conductivity, so that high-temperature heat generated from the heat generating element 202 can be transferred to the compressor housing 2, and consequently, high-temperature heat generated from the heat generating element 202 can be relatively rapidly dissipated by performing heat transfer with low-temperature refrigerant. Thereby, occurrence of an error on the electric compressor due to a malfunction can be prevented.

Because the main body 310 is disposed in a central portion of the fastening unit 300 and the cover body 320 is configured to enclose the outer surface of the main body 310, heat can be rapidly transferred to the compressor housing 2. A head part of the main body 310 has a diameter greater than that of the cover body 320 so that heat generated from the heat generating element 202 can be more effectively transferred to the compressor housing 2, whereby the heat generating element 202 can be prevented from overheating.

Either iron or an aluminum alloy is selectively used as the material of the cover body 320. However, materials other than the above-listed materials may also be used, and the material of the cover body 320 is not specially limited to the above-listed materials.

So as to make the heat generating element 202 be disposed in surface contact with one surface of the compressor housing 2, when it is assumed that a distance between the lower surface of the printed circuit board 200 and the lower surface of the heat generating element 202 is L1 and a distance between the lower surface of the printed circuit board 200 and the one surface of the compressor housing 2 is L2, the electric compressor 1 is configured such that the distance L1 is greater than the distance L2. Therefore, when a worker installs the printed circuit board 200 on the compressor housing 2, the lower surface of the heat generating element 202 can be brought into fully close contact with the one surface of the compressor housing 2.

In this case, the lower surface of the heat generating element 202 can be stably maintained in close contact with the one surface of the compressor housing 2, without being spaced apart from the surface of the compressor housing 2 or only partially making contact therewith. Accordingly, reliable heat transfer can be secured.

Therefore, heat generated from the plurality of heat generating elements 202 can be transferred to the compressor housing 2 and effectively dissipated through heat exchange with low-temperature refrigerant, whereby the heat generating elements 202 can be normally operated without being heated to excessive high temperatures.

The compressor housing 2 is configured such that the thickness of a plate formed on a surface thereof that faces the printed circuit board 200 is less than that of plates of the other adjacent surfaces thereof. Thereby, heat generated from the heat generating elements 202 can be more rapidly transferred to low-temperature refrigerant and thus more effectively cooled.

The surface of the compressor housing 2 that faces the printed circuit board 200 has a thickness of 2 mm or less so that high-temperature heat generated from the heat generating elements 202 can be rapidly transferred to the low-temperature refrigerant. The other adjacent surfaces of the compressor housing 2 have a thickness of 2 mm or more so that the compressor housing 2 can be prevented from being damaged or broken when the inverter cover 100 is mounted thereto.

Therefore, heat generated from the heat generating elements 202 can be transferred to the one surface of the compressor housing 2 that has a relatively large contact surface, whereby the heat transfer performance and cooling performance can be improved. Consequently, the operating temperature of the heat generating elements 202 can be retained within a temperature range required in a design value, thus assisting in the normal operation of the heat generating elements 202.

The coupling unit 400 may employ a screw or bolt which is selectively fixed between or released from the inverter cover 100 and the compressor housing 2, but other configurations may be used so long as the inverter cover 100 and the compressor housing 2 can be stably fixed to each other.

The compressor housing 2 includes an extension 2a which extends toward the lower surface of the printed circuit board, and into which the fastening unit is inserted. For example, a coupling part 30 such as a screw or bolt is inserted into the extension 2a from the outside of the printed circuit board 200.

Hereinafter, an electric compressor according to another embodiment of the present invention will be described with reference to the attached drawings.

Figure 5:
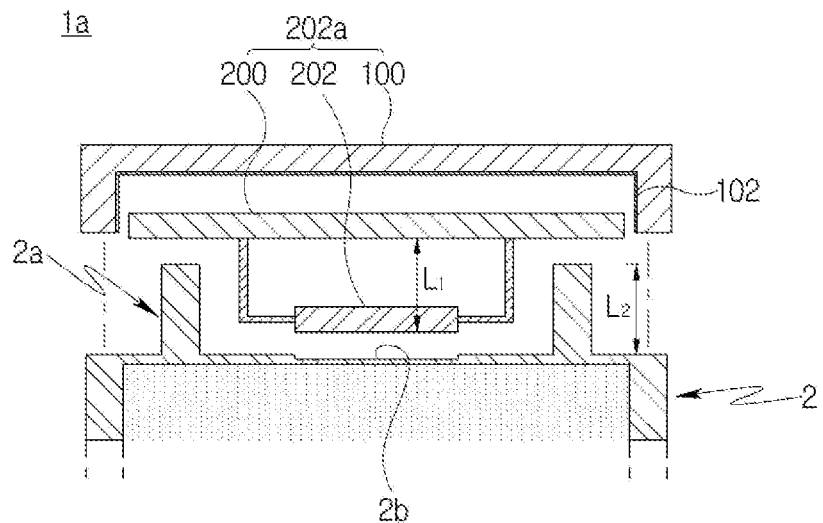
FIG. 5 is a sectional view illustrating an electric compressor in accordance with another embodiment of the present invention.

Referring to FIG. 1 or 5, an electric housing 1a includes a compressor housing 2, which has a depression 2b on an outer surface thereof, and in which refrigerant compression is implemented, an inverter cover 100 which is mounted to the outer surface of the compressor housing 2, and a printed circuit board 200 which is disposed inside the inverter cover 100 and is mounted with a plurality of heat generating elements 202 that are inserted into the depression 2b and perform heat transfer with low-temperature refrigerant supplied into the compressor housing 2.

The electric compressor 1a includes an inverter 202a which includes the heat generation elements 202 mounted to the printed circuit board 200 and a plurality of electronic components (not shown) so as to supply power to the motor unit 3 described in the foregoing embodiment and control the operating conditions thereof.

Although the inverter 202a has been illustrated as being disposed behind the compressor housing 2, the position of the inverter 202a is not limited to this position, and it may be modified in various ways. The inverter 202a includes the inverter cover 100, and the printed circuit board 200 to which the plurality of heat generating elements 202 are mounted.

The inverter cover 100 is mounted to the outer surface of the compressor housing 2 in which refrigerant compression is implemented. In more detail, the inverter cover 100 is disposed outside the above-described intake port 6 and fixed to the compressor housing 2 by a coupling unit 400, which will be described later herein.

The depression 2b is formed at a position facing the heat generating elements 202. In this embodiment, depressions 2b, the number of which corresponds to that of the heat generating elements 202, are formed in the compressor housing 2. Each depression 2b has a depth to which the corresponding heat generating element 202 is partially inserted. The depth of the depression 2b is not limited to a special value, but it is preferable that the depression 2b have a depth of ½ or more of the thickness of the heat generating element 202 so that the area with which lower and side surfaces of the heat generating element 202 come into surface contact with the surface of the compressor housing 2 can be increased, whereby heat exchange with low-temperature refrigerant can be more effectively performed.

To embody more effective heat transfer with the heat generating device 202, either copper or aluminum, which has a relatively high thermal conductivity, is applied to the inner surface of the depression 2b, whereby a thermal transfer rate per unit area can be further increased. In this embodiment, because the contact area between the heat generating element 202 and the compressor housing 2 is increased, the amount of heat transferred to the compressor housing 2 per unit time can be increased.

The compressor housing 2 is configured such that the thickness of a surface thereof that faces the printed circuit board 200 is less than that of the other adjacent surfaces thereof. Thereby, heat generated from the heat generating elements 202 can be more rapidly transferred to low-temperature refrigerant and thus more effectively cooled.

The surface of the compressor housing 2 that faces the printed circuit board 200 has a thickness of 2 mm or less so that high-temperature heat generated from the heat generating elements 202 can be rapidly transferred to the low-temperature refrigerant. The other adjacent surfaces of the compressor housing 2 have a thickness of 2 mm or more so that the compressor housing 2 can be prevented from being damaged or broken when the inverter cover 100 is mounted thereto.

Therefore, heat generated from the heat generating elements 202 can be transferred to the one surface of the compressor housing 2 that has a relatively large contact surface, whereby the heat transfer performance and cooling performance can be improved. Consequently, the operating temperature of the heat generating elements 202 can be retained within a temperature range required in a design value, thus assisting in the normal operation of the heat generating elements 202.

The electric compressor 1a includes a fastening unit 300 which is fixed to the compressor housing 2 from the outside of the printed circuit board 200. As shown in the drawings, either a screw or a bolt is selectively used as the fastening unit 300. However, the fastening unit 300 is not limited to a specific element.

In an embodiment, the fastening unit 300 includes a main body 310 and a cover body 320. One end of the main body 310 is inserted into the compressor housing 2, and the other end thereof extends to an upper surface of the heat generating element 202. The main body 310 has a first thermal conductivity. The cover body 320 encloses an outer surface of the main body 310 and has a second thermal conductivity different from that of the main body 310.

An external thread for coupling with the compressor housing 2 is longitudinally formed on the outer surface of the main body 310 so that the main body 310 can be fixed the compressor housing 2. For reference, an internal thread is formed in an insert hole that is formed in the compressor housing 2 with which the lower surface of the heat generating element 202 is brought into close contact, whereby the fixed state thereof can be stably retained.

The heat generating element 202 has an open insert hole into which the main body 310 is inserted, but an internal thread is not formed in the open insert hole, and the main body 310 merely comes into surface contact with the inner surface of the open insert hole.

Any one of copper, aluminum or silver is selectively used as the material of the main body 310. The copper, aluminum or silver has a high thermal conductivity, so that high-temperature heat generated from the heat generating element 202 can be transferred to the compressor housing 2, and consequently, high-temperature heat generated from the heat generating element 202 can be relatively rapidly dissipated by performing heat transfer with low-temperature refrigerant. Thereby, occurrence of an error on the electric compressor 1a due to a malfunction can be prevented.

Because the main body 310 is disposed in a central portion of the fastening unit 300 and the cover body 320 is configured to enclose the outer surface of the main body 310, heat can be rapidly transferred to the compressor housing 2. A head part of the main body 310 has a diameter greater than that of the cover body 320 so that heat generated from the heat generating element 202 can be more effectively transferred to the compressor housing 2, whereby the heat generating element 202 can be prevented from overheating.

Either iron or an aluminum alloy is selectively used as the material of the cover body 320. However, materials other than the above-listed materials may also be used, and the material of the cover body 320 is not specially limited to the above-listed materials.

Hereinafter, an electric compressor according to another embodiment of the present invention will be described with reference to the attached drawings.

Figure 6:
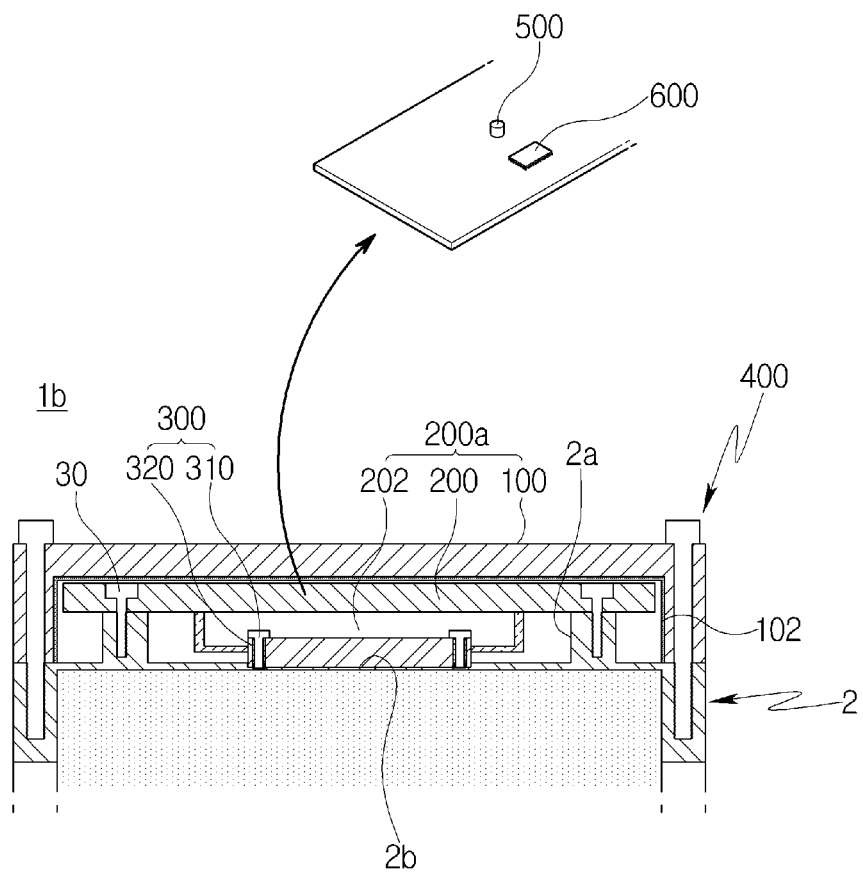
FIG. 6 is a sectional view illustrating an inverter installed in an electric compressor in accordance with another embodiment of the present invention.

Referring to FIG. 6, an electric compressor 1b includes a compressor housing 2, which has a depression 2b on an outer surface thereof, and in which refrigerant compression is implemented, an inverter cover 100 which is mounted to the outer surface of the compressor housing 2, a printed circuit board 200 which is disposed inside the inverter cover 100 and is mounted with a plurality of heat generating elements 202 that are inserted into the depression 2b and perform heat transfer with low-temperature refrigerant supplied into the compressor housing 2, a fastening unit 300 which is fixed to the compressor housing 2 from the outside of the printed circuit board 200, a sensing unit 500 which senses the operating temperature of the heat generating elements 202, and a control unit 600 which selectively controls, depending on the sensed temperature state of the heat generating elements 202, a circulation rate of refrigerant circulating through the compressor housing 2. For reference, an inverter 202a includes the heat generating elements 202 and the printed circuit board 200.

In the present embodiment, explanation of the same technical configurations as those of the foregoing embodiments will be omitted if deemed redundant, and only the sensing unit 500 and the control unit 600 will be described.

The sensing unit 500 senses the temperature of the heat generating elements 202 that are operated at high temperatures. In detail, the sensing unit 500 is mounted to the printed circuit board 200 and senses the temperature of the heat generating elements 202 and the temperature of the printed circuit board 200 at the same time. The control unit 600 receives the sensed values from the sensing unit 500, calculates data about the current operating temperature of the printed circuit board 200 and the temperature of the heat generating elements 202, and determines whether they are normally operated.

Particularly, the control unit 600 controls the operating conditions of the electric compressor 1 depending on the temperature data of the heat generating elements 202 such that when it is determined that the heat generating elements 202 are operated at temperatures higher than an operating temperature corresponding to a design value, the refrigerant circulation rate is increased to prevent the heat generating elements 202 from being damaged or malfunctioning.

The control unit 600 controls the operating conditions of the electric compressor 1 such that, when it is in the normal state, refrigerant circulates at a predetermined refrigerant circulation rate, and when the heat generating elements 202 are excessively heated, the refrigerant circulation rate is increased to prevent the heat generating elements from overheating.

Therefore, even when the electric compressor 1 is operated over a long time or the heat generating elements 202 are intermittently maintained in a high-temperature state, the heat generating elements 202 can be prevented from being damaged, and the normal operating state of the electric compressor 1 can be reliably maintained.

Hereinafter, an electric compressor according to another embodiment of the present invention will be described with reference to the attached drawings.

Figure 7:
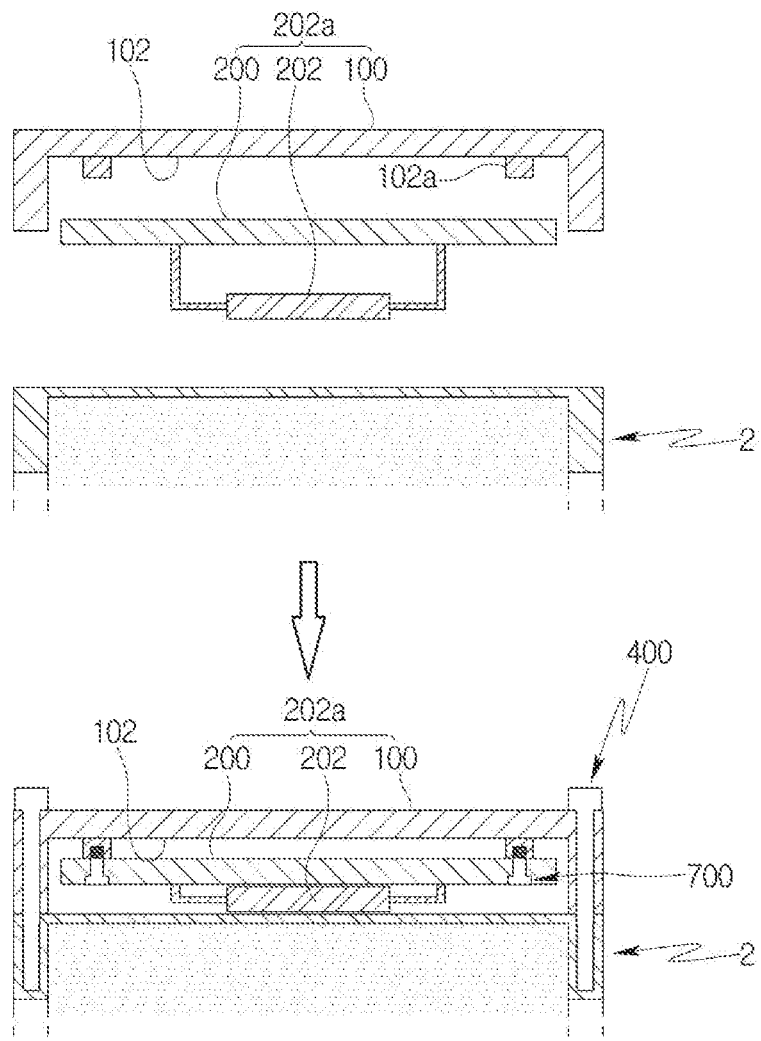
FIG. 7 is a sectional view illustrating an electric compressor in accordance with another embodiment of the present invention.

Referring to FIG. 7, the electric compressor according to the present embodiment is assembled in such a way that a printed circuit board 200 is coupled to an inner surface of an inverter cover 100 and, thereafter, the inverter cover 100 is coupled to a compressor housing 2.

In this case, each heat generating element 202 is assembled such that a lower surface thereof comes into close contact with one surface of the compressor housing 2. Particularly, in the case of the present embodiment, when the worker assemblies the inverter cover 100 with the compressor housing 2, a coupling unit 700 is coupled in a thread-coupling manner to an extension 102a that is formed on the inner surface of the inverter cover 100.

In this case, the distance between the lower surface of the heat generating element 202 and the upper surface of the compressor housing 2 can be adjusted to a predetermined distance, thus making tolerance management possible. Therefore, in consideration of heat generating conditions of the heat generating elements 202, the assembly state of the heat generating elements 202 can be optimized.

Therefore, tolerance management for reliably dissipating heat from the heat generating elements 202, which are operated at high temperature, can be easily realized by adjusting the depth to which the bolt of the coupling unit 700 is tightened.

INDUSTRIAL APPLICABILITY

The present invention can be applied to a vehicle, an industrial vehicle, or industrial equipment that is provided with an electric compressor.

The invention claimed is:

1. An electric compressor comprising:
an inverter cover (100) mounted to an outer surface of a compressor housing (2) in which compression of refrigerant is implemented;
a printed circuit board (200) disposed inside the inverter cover (100) and mounted with a plurality of heat generating elements (202) that come into surface contact with one surface of the compressor housing (2) and perform heat transfer with low-temperature refrigerant supplied into the compressor housing (2); and
a fastening unit (300) fixed to the compressor housing (2) from an outside of the printed circuit board (200), wherein the fastening unit (300) includes:
a main body (310) having a first end inserted into the compressor housing (2) and a second end extending to an upper surface of a corresponding one of the heat generating elements (202), wherein the main body (310) has a first thermal conductivity; and
a cover body (320) configured to enclose an outer surface of the main body (310), the cover body (320) having a second thermal conductivity different from the first thermal conductivity of the main body (310).

2. The electric compressor according to claim 1, wherein when it is assumed that a distance between a lower surface of the printed circuit board (200) and a lower surface of each of the heat generating elements (202) is L1, and
when it is assumed that a distance between the lower surface of the printed circuit board (200) and the one surface of the compressor housing (2) is L2,
the distance L1 is greater than the distance L2.

3. The electric compressor of claim 1, wherein the inverter cover (100) comprises:
a heat absorption part (102) formed on an inner surface of the inverter cover (100) so as to absorb high-temperature heat generated from the printed circuit board (200).

4. The electric compressor according to claim 1,
wherein any one of copper, aluminum or silver is selectively used for the main body (310), and
wherein any one of iron or an aluminum alloy is selectively used for the cover body 320).

5. The electric compressor according to claim 1,
wherein the compressor housing (2) is configured such that a thickness of a plate formed on a surface thereof that faces the printed circuit board (200) is less than a thickness of a plate of an adjacent surface thereof.

6. The electric compressor according to claim 1, further comprising:
a coupling unit (400) selectively fixed between or released from the inverter cover (100) and the compressor housing (2).

7. The electric compressor according to claim 1, wherein the compressor housing (2) comprises:
an extension (2a), which extends toward a lower surface of the printed circuit board (200), and into which the fastening unit (300) is inserted; and
a coupling part (30) coupled to the extension (2a) outside the printed circuit board (200).

8. An electric compressor comprising:
a compressor housing (2) in which compression of refrigerant is implemented, with a depression (2b) formed in an outer surface of the compressor housing (2) and an extension (2a) extending from the compressor housing (2);
an inverter cover (100) mounted to the outer surface of the compressor housing (2);
a printed circuit board (200) disposed inside the inverter cover (100) and mounted with a plurality of heat generating elements (202) that perform heat transfer with low-temperature refrigerant supplied into the compressor housing (2), the heat generating elements (202) being disposed in the depression (2b);
a coupling part (30) coupled to the extension (2a) outside the printed circuit board (200); and
a fastening unit (300) fixed to the compressor housing (2) from an outside of the printed circuit board (200), wherein the fastening unit includes:
a main body (310) including a first end inserted into the compressor housing (2) and a second end extending to an upper surface of a corresponding one of the heat generating elements (202), wherein the main body (310) has a first thermal conductivity; and
a cover body (320) configured to enclose an outer surface of the main body, the cover body (320) having a second thermal conductivity different from the first thermal conductivity of the main body (310).

9. The electric compressor according to claim 8, wherein the depression (2b) is formed at a position facing the heat generating elements (202).

10. The electric compressor according to claim 8, wherein the depression (2b) is formed to a depth to which the heat generating elements (202) are partially inserted.

11. The electric compressor according to claim 8,
wherein the compressor housing (2) is configured such that a thickness of a plate formed on a surface thereof that faces the printed circuit board (200) is less than a thickness of a plate of an adjacent surface thereof.

12. An electric compressor comprising:
a compressor housing (2) in which compression of refrigerant is implemented, with a depression (2b) formed in an outer surface of the compressor housing (2) and an extension (2a) extending from the compressor housing (2);
an inverter cover (100) mounted to the outer surface of the compressor housing (2);
a printed circuit board (200) disposed inside the inverter cover (100) and mounted with a plurality of heat generating elements (202) that perform heat transfer with low-temperature refrigerant supplied into the compressor housing (2), the heat generating elements (202) being disposed in the depression (2b);
a fastening unit (300) fixed to the compressor housing (2) from an outside of the printed circuit board (200), wherein the fastening unit includes:
a main body (310) including a first end inserted into the compressor housing (2) and a second end extending to an upper surface of a corresponding one of the heat generating elements (202), wherein the main body (310) has a first thermal conductivity; and
a cover body (320) configured to enclose an outer surface of the main body (310), the cover body (320) having a second thermal conductivity different from the first thermal conductivity of the main body (310); and
a sensing unit (500) configured to sense an operating temperature of the heat generating elements;
a control unit (600) configured to selectively control, depending on a temperature state of the heat generating elements (202) sensed by the sensing unit (500), a circulation rate of the refrigerant that circulates through the compressor housing (2); and a coupling part (30) coupled to the extension (2*a*) outside the printed circuit board (200).

\* \* \* \* \*